Patented June 20, 1933

1,915,064

UNITED STATES PATENT OFFICE

VINCENT T. MALCOLM, OF INDIAN ORCHARD, MASSACHUSETTS, ASSIGNOR TO THE CHAPMAN VALVE MANUFACTURING COMPANY, OF INDIAN ORCHARD, MASSACHUSETTS, A CORPORATION OF MASSACHUSETTS

METAL ALLOY

No Drawing. Application filed October 21, 1930. Serial No. 490,333.

This invention relates to improvements in metal alloys and is directed more particularly to improvements in alloys which are adapted to withstand certain chemical reactions and specifically, to withstand conditions to which equipment in the oil industry is subjected. This equipment includes high pressure steam and oil lines; oil refinery equipment which is subjected to corrosive sulfur containing liquids and gases and to high temperatures and pressures; valves and fittings for pipe lines, and the like.

The principal objects of the invention are the provision of an alloy which is resistant to oxidation and corrosion, which resists scaling and the action of hydrogen sulphide and which is not unfavorably affected by relatively high temperatures such as for instance, temperatures of approximately 1200 degrees Fah.

The alloy of the invention is adapted for general application but has been found to be particularly well adapted for use in the manufacture of pipe line valves of all kinds and parts therefor. Valves in high pressure steam and oil lines are used under various conditions and are therefore subjected to the deteriorating effects of high temperatures and various chemical and physical reactions. It is to withstand these reactions that the alloy of the invention more particularly relates. It has been discovered that valves and the like which are made of the metal alloy of the invention are more capable of withstanding certain chemical reactions, to which they are subjected to in service, than are valves made from other materials heretofore known.

In accordance with the novel features of the invention iron and certain other constituents are alloyed with chromium, tungsten and silicon. I have discovered that these constituents, together with carbon, when combined in certain critical proportions, coact to produce a new material or alloy which has unusual and unexpected characteristics and properties.

The alloy of my invention resists corrosion, scaling, and deterioration at high temperatures and pressures; it maintains high tensile strength and low creep at elevated temperatures and is resistant to attack of corrosive gases, such as those containing sulfur compounds, for example.

The alloy of the invention comprises the constituents hereinafter more fully set forth. These in a broad way are as follows:

| | Per cent |
|---|---|
| Chromium | 4. to 8. |
| Silicon | .3 to 2. |
| Tungsten | .75 to 2. |
| Carbon | .15 to .50 |
| Manganese | .40 to .60 |
| Phosphorus | .05 maximum |
| Sulphur | .05 maximum |
| Iron | Balance |

It has been found, however, that an alloy comprising the specific proportions of constituents as set forth in the following formula gives very desirable results:

| | Per cent |
|---|---|
| Chromium | 6. |
| Silicon | .75 |
| Tungsten | 1. |
| Carbon | .25 |
| Manganese | .40 to .60 |
| Phosphorus | .05 maximum |
| Sulphur | .05 maximum |
| Iron | Balance |

An alloy made in accordance with the foregoing formula when made into valves and parts thereof have been found to have not only great resistance to the corrosive action of $H_2S$ gas, but is well adapted to resist scaling and the usual unfavorable effects of relatively high temperatures, or temperatures in the neighborhood of 1200 degrees Fah. Metals used for the manufacture of valves and parts thereof are in service subjected to various conditions, but as has been stated it has been discovered that an alloy including the chromium, silicon and tungsten in the proportions mentioned is well adapted to withstand the most severe conditions. For instance, valves made from the alloy and used in high pressure steam and oil lines where the temperature is in the neighborhood of 1200 degrees Fah. are not unfavorably affected and where the metal is subjected to the usual chemical reactions which bring about corrosion, scaling and the like, the valves are found to be much more serviceable than valves made from metals heretofore known.

I believe that I am the first to recognize the fact that by the use of the elements mentioned that it is possible to provide a metal alloy suitable for manufacturing into valves, etc., which is not likely to be subjected to the deteriorating effects of corrosion, scaling, etc. While I have mentioned valves as one use for which the alloy is adapted, it will be found equally desirable wherever metal is desired which will withstand or at least effectively resist corrosion, scaling and the unfavorable effects of the relatively high temperatures mentioned.

Having described the invention in the form at present preferred, what I now desire to claim and secure by Letters Patent of the United States is:

1. A sulfur resistant alloy steel containing 6 percent chromium, .75 per cent silicon, 1 percent tungsten, carbon from trace up to .50% and the balance substantially iron.

2. A sulfur resistant alloy steel containing, 6 percent chromium, .75 percent silicon and 1 percent tungsten, .25 percent carbon, .40 to .50 percent manganese and not more than .05 percent each of phosphorus and of sulphur, the balance being substantially iron.

3. A valve for high temperature and pressure steam and oil lines consisting of an alloy steel comprising as essential elements chromium from 4% to 8%, tungsten from .75% to 2%, silicon from .3% to 2.0% and carbon from trace up to .50%, the balance being substantially iron.

4. As a new article of manufacture, an alloy steel capable of withstanding severe pressures at 1200° F. and composed of chromium from 4% to 8%, tungsten from .75% to 2%, silicon from .3% to 2%, and carbon in appreciable amount up to .50%.

5. Oil refinery apparatus comprising alloy steel highly resistant to hydrogen sulfide and stable at high temperatures and pressures consisting of chromium from 4% to 8%, tungsten from .75% to 2%, silicon from .3% to 2%, and carbon in appreciable amount up to .50%.

6. An alloy steel comprising carbon .19% to about .24%, chromium 5%-6%, tungsten about .75% to about 1%, and the balance substantially all iron with the exception of small amounts of other elements usually present in steels, as silicon about .35%, manganese about .6%, sulfur less than .05%, phosphorus less than .05%.

7. As a new article of manufacture, an alloy steel corrosive resistant to oil and steam at high pressures and high temperatures and having high tensile strength above 1000° F. consisting of chromium from 4% to 8%, tungsten from .75% to 2%, carbon in appreciable amount up to .50% and the balance being all iron, except for steel making minor incidentals including silicon of about .3% up to 2%.

8. A valve having high tensile strength at temperatures above 1000° F. and corrosive resistant to high temperature and pressure steam and oil consisting of an alloy steel comprising as essential elements chromium from 4% to 8%, tungsten from .75% to 2%, carbon from trace up to .50%, the balance being all iron, except for steel making minor incidentals including silicon of about .3% up to 2%.

In testimony whereof I affix my signature.

VINCENT T. MALCOLM.